H. R. EVANS, DEC'D.
A. K. EVANS, EXECUTRIX.
MOTION PICTURE APPARATUS.
APPLICATION FILED JULY 27, 1916. RENEWED JAN. 7, 1922.
1,426,722. Patented Aug. 22, 1922.
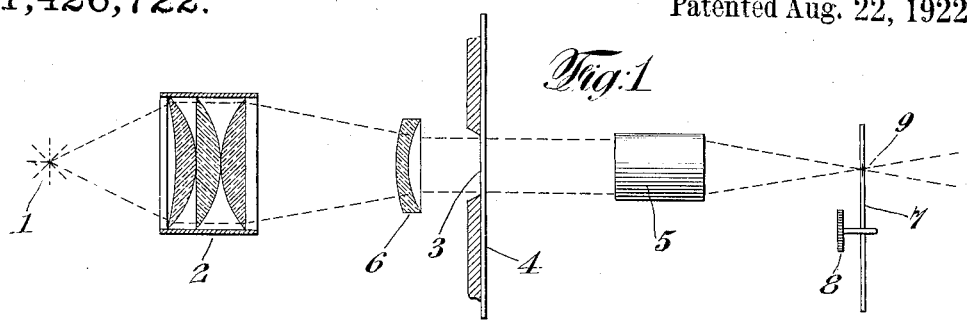
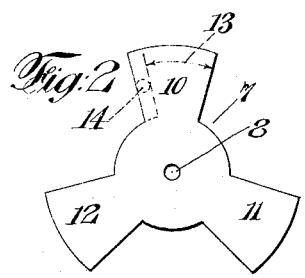
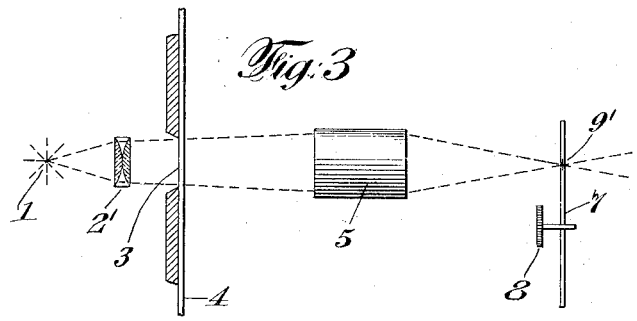
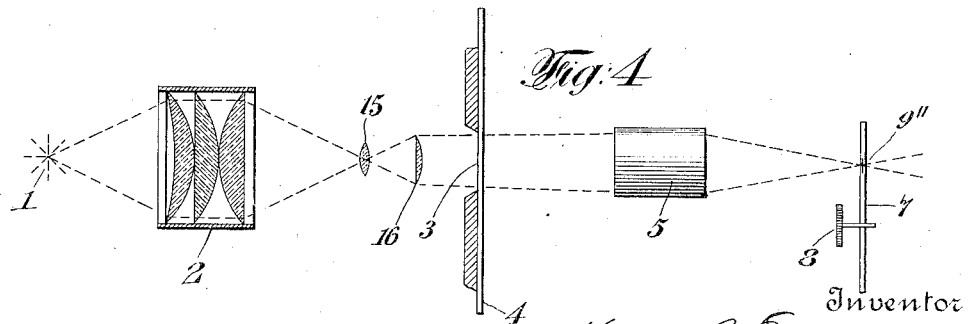
Inventor
Henry R. Evans,
By his Attorneys
Kenyon & Kenyon

UNITED STATES PATENT OFFICE.

HENRY R. EVANS, OF NEW YORK, N. Y.; ADELE KEAN EVANS EXECUTRIX OF SAID HENRY R. EVANS, DECEASED.

MOTION-PICTURE APPARATUS.

1,426,722.        Specification of Letters Patent.    Patented Aug. 22, 1922.

Application filed July 27, 1916, Serial No. 111,606. Renewed January 7, 1922. Serial No. 527,779.

*To all whom it may concern:*

Be it known that I, HENRY R. EVANS, a citizen of the United States, and a resident of the borough of Manhattan, in the city, county, and State of New York, have invented certain new and useful Improvements in Motion-Picture Apparatus, of which the following is a specification.

This invention relates to motion picture apparatus and more particularly to a lens system and obturator or shutter for use in a motion picture projecting machine.

The principal object of the invention is to provide a lens system that will bring the light beam to a substantial apex at a point in advance of the objective where obturation can be effected in a manner more convenient and satisfactory than has heretofore been the case.

A further object of the invention is increase in the efficiency of the transmission of light from the source through the lens system of a projecting machine to the screen.

Another object of the invention is the provision, at the apex formed as above mentioned, before the objective, of a shutter or obturator of substantially equal obturating sectors equally timed and of a total angular embrace less than is now used. This is enabled by the lens system that I have provided, and it reduces the flicker effect, as will hereinafter more fully appear.

The usual optical system in motion picture projecting machines involves the formation of an apex, i. e., the production of an enlarged image of the light source within the objective lens where for obvious reasons obturation is either impossible or difficult to effect, and when so effected affords little if any improvement owing to the large diameter of beam at this point. Furthermore, in such optical systems there is a considerable loss of light at the gate past which the film is fed, due to the well-known fact that where condensers are employed of the size that it has been found in practice advisable to use, the area of the light beam at said gate is considerably larger than is sufficient to illuminate the picture. Sometimes this loss is reduced by the reduction of the cross-section of the beam of light at the gate by forming the image of the light source at or about the plane of said gate instead of within the optical lens as aforesaid. In both cases a comparatively large diameter objective lens is required in order to pass the full beam at this point, thus reducing the depth of focus, which is a bad feature, especially where the projector must stand at an angle to the viewing screen, and furthermore, in both cases a beam of considerable cross-section is formed at the point where obturation takes place.

It has been proposed to provide an apex or restricted area in the beam of light between the gate and the source of light and to effect obturation at this point. But obturation at this point is not convenient and requires a special form of machine, and furthermore, in such system the loss of light in transmission from the source through the lens system is unnecessarily great.

With the ordinary type of film stepping movement, such for example, as the Geneva movement, it is the established practice not only to mask the objective while the film is being shifted, but also to mask it for two additional periods of time while the film is stationary at the film-gate for the purpose of reducing the flicker effect, but owing to the width of the beam at the plane of obturation and to the necessity for obtaining as much light as possible on the screen it is not practicable to make the three periods of obturation usually employed, equal to one another, since if they were all of as long a duration as that within which the film is stepped the total loss of light would be such as to be very undesirable. It will be readily understood that efficiency in light transmission, i. e., brightness of the pictures on the screen for a given luminosity of light source is a very important point in motion picture projection, as obturation alone usually reduces the amount of light reaching the screen by about 60%; also, the highly inflammable nature of the film employed, as well as the comfort of the operator and the cost of operation, demand that the power of the source of light be not greater than necessary. Therefore, the greater the illumition on the screen for a given luminosity of light source, the more desirable is the apparatus. By this invention, the width of the beam at the plane of obturation is made relatively very small the total period during which the objective is to be masked for the film to be stepped, which period comprises both the actual time occupied in stepping the film plus the time needed to intersect the beam so that it shall be completely masked before the stepping commences and until it has been fully completed, is only slightly longer than the actual period of stepping and is markedly less than when the width of the beam is such as is commonly the case. This effect enables a shutter to be employed at or about the usual location in advance of the objective, and of such a construction that when used with the ordinary Geneva movement, that period of obturation which takes place during the stepping of the film, and those periods of obturation which occur between two successive movements of the film are not only all of equal duration and occurring at equal intervals, thus eliminating flicker to a very large extent, but their total duration is less as compared with the duration needed with a similar movement for obturation at a point that is not at or at about such an apex.

My invention consists in the novel features and combinations hereinafter pointed out with respect to certain forms of my invention herein shown, and the invention will be more particularly set forth in the appended claims.

Further objects and advantages of the invention will more fully appear from the following description taken in connection with the accompanying drawings forming a part of this specification, and in which—

Fig. 1 illustrates diagrammatically one embodiment of my invention;

Fig. 2 illustrates the shutter or obturator as used by me; and

Figs. 3 and 4, respectively, illustrate modifications of the invention.

Referring to Fig. 1, 1 is a suitable source of light situated in optical alignment with a condenser 2 of well-known form, consisting of one concavo-convex lens and two plano-convex lenses. 3 represents the gate past which a picture-bearing film 4 is moved, and 5 illustrates an objective lens, while 6 illustrates a lens in the form of a negative meniscus inserted between the condenser and the gate, and 7 illustrates a shutter or obturator pivoted to rotate about an axis at 8. In the ordinary form of projecting apparatus now in use, the beam of light, after emerging from the condenser, is often brought to an apex within the objective. This not only, as heretofore pointed out, results in an unnecessary loss of light at the gate due to the size of the beam at the gate, but it produces a relatively large apex of the light beam and at a point where the shutter cannot very well intersect it. In the embodiment of my invention shown in Fig. 1 the condenser combination converges the light beam somewhat upon the lens 6 without forming an apex, which lens performs the function of rendering the beam of light falling upon the gate less converging in form, and in the particular illustration shown, of substantially uniform section. This lens is so chosen and located as to cause the beam of light to illuminate an area at the gate which is only slightly larger in diameter than the diagonal dimensions of the picture to be illuminated. The effect of the lens 6 in co-operation with the condenser and the objective, is to cause the beam of light to converge to an apex at 9 before and in proximity to the objective 5, at about the position obturators are commonly placed. The lens 6 also has the effect of correcting to a considerable extent, the spherical aberration caused by the condenser. It will be seen from this diagramatic figure that the condenser condenses the light rays emanating from the source 1, and that the condenser and the lens 6 together project the light rays through the gate and onto the objective lens in a beam less divergent than the beam that emanated from the source to the condenser, and more particularly the lenses project this beam through the gate and onto the objective so that the beam is of substantially uniform cross-section. The rays passing through the objective are caused to form a light beam having a well defined apex at 9, and of comparatively small cross-section, at which point it is cut by the sectors 10, 11, 12 of the shutter 7.

Referring to Fig. 2, the shutter or obturator there shown consists of three obturating fins or sectors 10, 11, 12 which are equidistant one from the other and are of the same size and of less size or angular embrace than is necessary in ordinary machines where obturation occurs at some other point in the light beam than at an apex. The total width or angular embrace of the blade 10, which is the blade that masks the objective during the film-stepping periods, is of the width indicated by the double arrowed line 13, and corresponds with the time that it actually takes to move the film one step, plus the relatively small angle subtended by the small diameter of the light beam at the apex; while 14 represents the cross-section of the apex of the light beam where obturation occurs.

Since these sectors 10, 11, 12 are all of uniform width, flickering is necessarily much less noticeable than would be the case if one were appreciably larger than the others, as is the case in general practice.

In Fig. 3 I have shown a modified embodiment of the invention in which the meniscus lens 6 is dispensed with, and instead of the ordinary large condenser 2, I utilize a relatively small condenser 2' in the example shown consisting of two plano-convex lenses considerably smaller in diameter than the lenses in the ordinary condensers in practice, and located closer to the gate 3. The condenser is preferably of just sufficient power to reduce the divergence of the light rays just sufficiently to uniformly illuminate the full area of the picture, and to continue the light rays onto the objective 5 in the direction from which they leave the condenser 2'. It will be noted that the beam of light extending from the condenser 2' to the objective is one slightly diverging.

Fig. 4 shows another embodiment of the invention in which the ordinary condenser 2 is used, and in conjunction therewith I preferably use a lens 15. As shown this lens is a bi-convex lens. Between this and the gate I use a plano-convex lens 16, preferably of just sufficient power to narrow the beam so that the area of the beam of light at the gate is just sufficient to uniformly illuminate the picture. In some cases the lens 15 may be omitted. It will be noted that the beam extending from this lens 16 through the gate and onto the objective does not converge, but is less divergent than the beam as it entered the lens 16. This form of the invention has the advantage of producing a beam of light slightly diverging as it enters the objective 5 but it has the disadvantage of two extra lenses, not present in the form shown in Fig. 3. As in the other modifications, the objective 5 in Fig. 4 co-operates with the rest of the lens system to produce a sharp apex or light source image at 9'', where obturation is effected.

It will be observed that one of the characteristic features of all of the modifications of the invention shown is that the optical means or system used, is in each case such that without the objective it would form an image of the light source at some plane beyond the determined position of the nodal point of the objective, and are such that when the objective is in place, it co-operates with the system to produce a smaller image in the light beam at an apex in advance of the objective, but closer to the position thereof than would be the image formed without the use of the objective.

It is obvious that the shutter employed in connection with my invention need not necessarily be composed of equal blades equidistantly spaced, although I prefer such construction because of the reduction of flicker effect obtained, but if the quantity of light allowed to reach the screen is considered of greater importance than to minimize flicker effect, then two of the blades may be narrowed in the usual manner, the third being just sufficiently to mask any movement of the film, thus obtaining a considerably greater period of illumination than is obtainable in the ordinarily employed systems without increasing their flicker effect.

While I have described my invention with particularity in connection with the embodiments thereof herein shown, it will be obvious to those skilled in the art, after having understood my invention, that various changes in the features and combinations thereof may be made, including the use of more complex and highly corrected optical elements, without departing from the spirit or scope of my invention, and I do not wish to be understood as limiting myself other than as indicated in the appended claims.

Having thus described my invention, what I claim as new and desire to secure by Letters Patent, is:—

1. In motion picture apparatus, the combination of a gate past which a film is to be moved, a source of light, an objective, optical means for condensing the light rays and directing them upon the gate and thence in the form of a slightly divergent light beam to the objective, said objective causing the light rays to form an apex beyond the same, whereby the rays converging from the objective form a relatively small apex, and a shutter at said apex for intermittently intercepting the light beam at said apex.

2. In motion picture apparatus, the combination of a gate past which a film is to be moved, a source of light, an objective, a condenser that condenses the light rays and directs them in the form of a slightly divergent light beam from it through the gate and to the objective, said objective causing the light rays to form an apex beyond the same, whereby the beam converging from the objective forms a relatively small apex, and a shutter at said apex for intermittently intercepting the light beam at said apex.

3. In motion picture apparatus, the combination of a gate past which a film is to be moved, a source of light, an objective, a relatively small condenser of only sufficient power to direct light rays in a non-converging beam upon the gate and of sufficient focus to continue the direction of the rays to the objective, said objective causing the light rays to form an apex beyond the same, whereby the beam converging from the objective forms a relatively small apex, and a shutter at said apex for intermittently intercepting the light beam at said apex.

In testimony whereof, I have signed my name to this specification.

HENRY R. EVANS.